March 24, 1942.  G. K. NEWELL  2,277,135
COMPRESSOR APPARATUS
Filed April 29, 1940
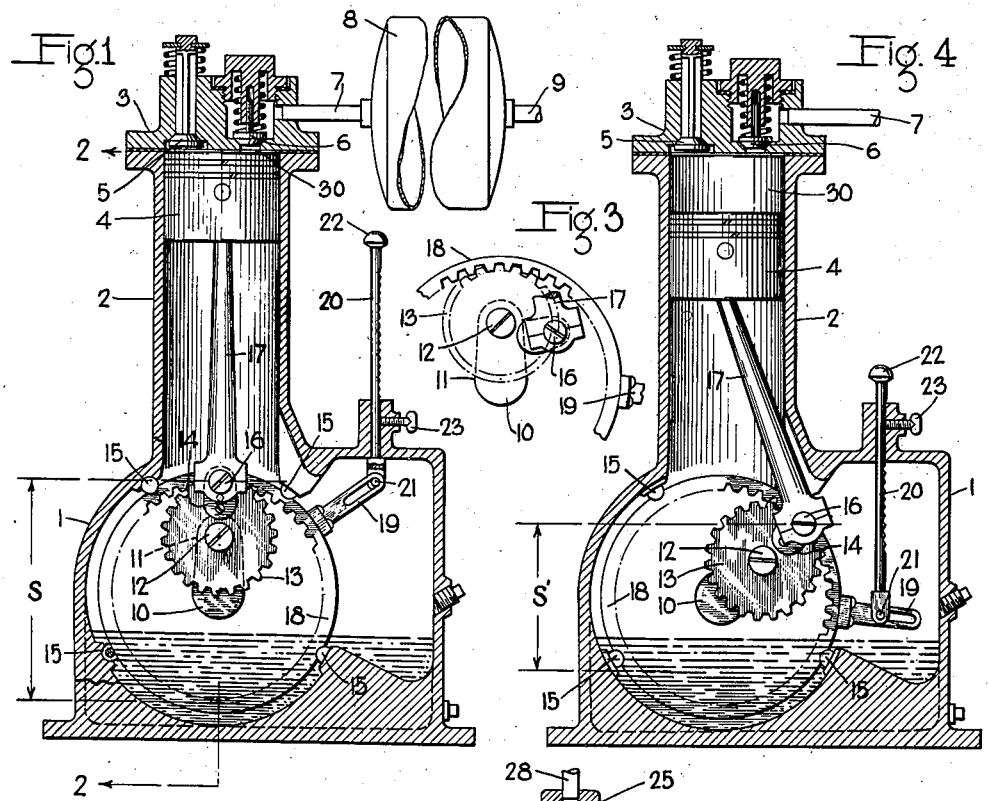
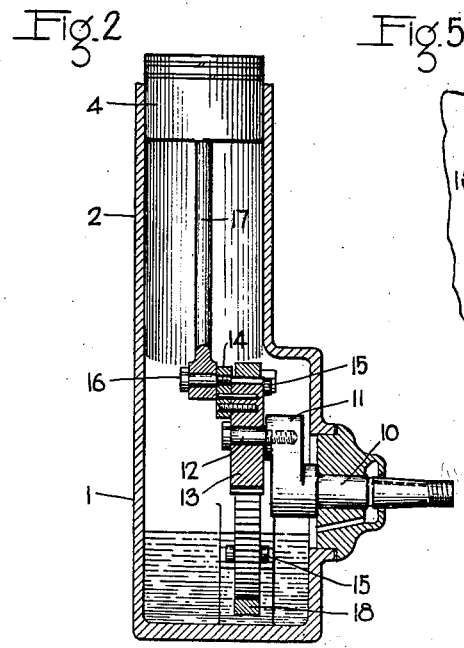
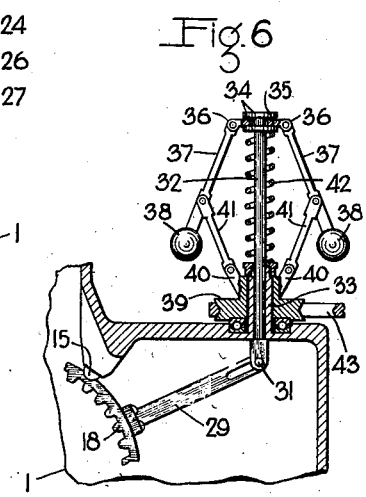
INVENTOR
GEORGE K. NEWELL
BY *A. M. Higgins*
ATTORNEY Patented Mar. 24, 1942

2,277,135

UNITED STATES PATENT OFFICE 2,277,135

COMPRESSOR APPARATUS

George K. Newell, near Pitcairn, Pa., assignor to The Westinghouse Air Brake Company, Wilmerding, Pa., a corporation of Pennsylvania Application April 29, 1940, Serial No. 332,197

11 Claims. (Cl. 230—20)

This invention relates to fluid compressors and more particularly to the reciprocating piston type.

One object of the invention is to provide a fluid compressor embodying novel means for adjusting the stroke of the compressor piston.

Another object of the invention is to provide a fluid compressor embodying novel means for varying the stroke and thereby the displacement of the compressor piston in accordance with the pressure desired to be delivered by the compressor.

Another object of the invention is to provide a fluid compressor embodying novel means for providing a certain stroke of the compressor piston when the pressure delivered by the compressor is less than a certain desired degree and a less or substantially no stroke when the pressure exceeds said desired degree.

Another object of the invention is to provide a fluid compressor embodying novel means for providing a certain maximum stroke of the piston for compressing air and for reducing the stroke to any desired degree less than maximum or for rendering the piston substantially non-reciprocable when the pressure of the air compressed by the compressor exceeds a desired degree.

Another object of the invention is to provide a fluid compressor embodying means operable automatically to vary the stroke of the piston inversely according to the speed of a vehicle propulsion motor in order to provide a maximum amount of compressed air when said propulsion motor is operating at a reduced or idling speed, as when the vehicle is coasting down a grade or approaching a stop, under which condition the maximum amount of compressed air is required for use in the brake system of a train, and to reduce the amount of compressed air delivered by the compressor when the propulsion motor is working at a higher speed under which condition the need for compressed air is reduced to a minimum.

Another object of the invention is to provide an improved fluid compressor in which the power for operating the compresor piston is applied to the piston throughout the full stroke thereof in a line parallel to the axis of the piston so as to eliminate side thrust of the piston against the cylinder wall and thereby reduce wear of the piston and cylinder wall and also to provide for better balance of the dynamic forces in the compressor.

Other objects and advantages will be apparent from the following more detailed description of the invention.

In the accompanying drawing; Fig. 1 is a vertical, cross sectional view of a fluid compressor embodying the invention; Fig. 2 is a sectional view taken on the line 2—2 in Fig. 1; Fig. 3 is a view of a portion of the compressor shown in Fig. 1 with certain parts in a different position; Fig. 4 is a view similar to Fig. 1 but showing said parts in still another position; and Figs. 5 and 6 are sectional views of modifications of the invention.

Description

As shown in the drawing, the fluid compressor comprises a casing embodying a crank case 1, a cylinder 2 and a cylinder head 3. A fluid displacement piston 4 is slidably mounted in cylinder 2 and is operative upon reciprocation therein to alternately draw air from the atmosphere through an intake valve 5 and to compress said air and to discharge same past a discharge valve 6 to a pipe 7 leading to a storage reservoir 8 which is provided with an outlet pipe 9 through which compressed air is adapted to be drawn from said reservoir for any desired use.

A crank shaft 10 is journaled in a suitable bearing in the crank case and is provided with a crank arm 11 having a crank pin 12. The crank pin 12 may be secured to the crank arm 11 by screw threaded engagement as shown, and journaled on this pin is a gear 13. An arm 14 is rigidly secured to gear 13 on the face opposite the crank arm 11 and secured to this arm and projecting therefrom is a secondary crank pin 16 the axis of which preferably intersects the pitch circular of the teeth on gear 13. One end of a connecting rod 17 is journaled on the secondary crank pin 16 while the other end is rockably connected to the piston 4 in the usual manner.

The gear 13 constitutes a pinion the teeth of which are meshed with internal teeth formed on a ring gear or rack 18 which surrounds the gear 13 and the ring gear 18 is rigidly supported in crank case 1 in concentric relation with the crank shaft 10 on suitably spaced bearings 15 which are preferably of the anti-friction type. Projecting from one side of the ring gear 18 is an arm 19 through the medium of which said gear is adapted to be turned in its bearings for adjusting the stroke of piston 4 in cylinder 2, as will be later described.

The number of gear teeth on the ring gear 18 is twice the number on the pinion 13 so that for each revolution of the crank shaft 10 the pinion 13 will make two complete revolutions within the ring gear 18.

Operation

In operation, when the crank shaft 10 is turned from any suitable source of power the crank arm 11 acts through the crank pin 12 to carry the pinion 13 therewith and due to the toothed engagement between said pinion and the ring gear 18 said pinion is caused to rotate on pin 12 and make two complete revolutions for each revolution of the crank shaft. During one half revolution of the crank shaft the secondary crank pin 16 carried by the pinion 13 and connected to the connecting rod 17 will therefore move from a point at one side of the ring gear 18 to a diametrically opposite point, the distance between these points measured in a direction parallel to the axis of the cylinder being equal to the stroke of the piston 4 on both its intake and compression strokes.

In Fig. 1 of the drawing the crank arm 11 is shown in its upper dead center position and the ring gear 18 is shown adjusted to provide for the maximum stroke of piston 4, it being noted that as shown the axes of the secondary crank pin 16, the crank pin 12 and the crank shaft 10 are all included in a plane extending parallel to the axis of cylinder 2. With the parts thus conditioned, the piston 4 is in its uppermost position or at the end of a compression stroke.

Upon rotation of crank shaft 3 from the top dead center position the pinion gear 13 and thereby the connecting rod 17 will be operated to pull the piston 4 downwardly on its intake stroke the end of which will be obtained at the time the secondary crank pin 16 occupies a position diametrically opposite that shown in Fig. 1. Continued rotation of the crank shaft will then return the secondary crank pin to the position shown and it will be apparent that the stroke of the piston during both intake and compression will therefore be equal to the pitch diameter of the ring gear 18, such stroke being indicated by the letter S shown in Fig. 1.

With the ring gear 18 adjusted, as just described, it will also be noted that the secondary crank pin 16 travels in a straight line between the position shown and the diametrically opposite position. In other words, under this condition there will be no rocking of the connecting rod 17 relative to the piston 4 during reciprocation of said piston as in conventional structures, but instead, the connecting rod will remain parallel to the axis of the cylinder and as a result there will be no side thrust of the piston 4 against the wall of cylinder 2 during operation of the compressor thereby substantially eliminating wear of the piston and cylinder wall due to such action. Also, this feature provides for better balance of the dynamic forces in the compressor during operation thereof.

Now let it be assumed that the arm 19 and thereby the ring gear 18 are turned from the position shown in Fig. 1 to the position shown in Figs. 3 and 4. Assuming that the crank shaft 10 is stationary this rotation of ring gear 18 causes the pinion gear 13 to turn relative to the crank shaft, and assuming that the crank arm 11 is in its upper dead center position as shown in Fig. 1 the secondary crank pin 16 may assume a position such as shown in Fig. 3. Now assume that the crank shaft 10 is turned relative to the ring gear 18 in a clockwise direction. This turns the pinion gear 13 within the ring gear 18 and moves the secondary crank pin 16 in the direction of the compressor cylinder 2 and at the time the axis of said pin becomes lined up with the axes of the crank pin 12 and the crank shaft 10, as shown in Fig. 4, the secondary crank pin 16 will be at the outermost portion of the pinion gear 13 with its axis in alignment with the pitch circle of the teeth on the ring gear.

In operation of the compressor the secondary crank pin 16 will then move from the position just described and shown in Fig. 4 diametrically across the ring gear 18 to the opposite side thereof, this movement being the same in degree as obtained when the ring gear 18 is adjusted as shown in Fig. 1 but at an angle to the axis of the cylinder 2, so that the stroke of piston 4 resulting from this movement is equal to the distance between the diametrically opposite positions which the pin 16 obtains measured parallel to the axis of the cylinder 2 and as indicated by the letter S' in Fig. 4. By turning the ring gear 18 to the position shown in Figs. 3 and 4 the stroke of the compressor piston 4 is thus reduced and due to the greater clearance volume above said piston at the end of its compression stroke, the pressure which the compressor is able to deliver is proportionately reduced.

If the ring gear 18 is turned further in a clockwise direction from the position shown in Figs. 3 and 4 corresponding further reduction in the stroke of piston 2 will occur and the pressure of fluid delivered by the compressor will be correspondingly reduced, and if turned through an arc of 90° from the position shown in Fig. 1 the secondary crank pin 16 will occupy a position diametrically opposite to that shown in Fig. 1. With this final adjustment the pin 16 during operation of the compressor will move diametrically across the ring gear 18 at right angles to the axis of the cylinder 2 in which case the compressor piston 4 will remain in a substantially stationary position within the cylinder 2. In other words, by the proper adjustment of the ring gear 18 relative to the crank shaft the stroke of the piston 4 can be varied from a maximum stroke obtained with the adjustment shown in Fig. 1 to any desired lesser stroke, or reciprocation of the piston can be caused to stop in the extreme adjusted position just described. By the proper adjustment the compressor can thus be caused to deliver compressed air at any desired pressure or it can be arranged to operate with the maximum stroke under certain conditions and can be caused to stop pumping air by reducing the stroke even though the crank shaft 10 continues to operate.

The adjustment of ring gear 18 can be accomplished in any desired manner, as for instance as shown in Figs. 1 and 4 by means of a rod 20 slidably mounted in the crank case. The inner end of this rod is bifurcated and connected by a pin 21 to the ring gear arm 19 and on the outer end of the rod there is provided a knob 22 through the medium of which the rod and thereby the gear 18 may be adjusted manually to any desired position. A set screw 23 having screw threaded engagement with the crank case is provided for locking the rod 20 in an adjusted position to thereby rigidly secure the ring gear 18 against movement. By this arrangement an operator may adjust the compressor to deliver compressed air at any pressure he may desire to use and it will be apparent that since the clearance volume 30 at the pressure face of the piston 4 at the end of its compression stroke limits the degree of pressure which the compressor is able to deliver the compressor may be allowed to operate continuously without causing the pressure of air delivered exceeding such value.

*Modification shown in Fig. 5*

If desired, the adjustment of the ring gear to vary the stroke of the compressor piston 4 may be controlled by mechanism such as shown in Fig. 5 which comprises a piston 24 subject on one side to the pressure of fluid in a pressure chamber 25 and on the opposite side to the opposing pressure of a spring 26. The spring 26 encircles a piston rod 27 connecting piston 24 to the ring gear arm 19 by pin 21.

With this arrangement whenever fluid under pressure is supplied to the pressure chamber 25 to a degree sufficient to effect movement of the piston 24 against the spring 26, said piston will operate the ring gear 18 to reduce the stroke of the compressor piston 4 and when the pressure of fluid is reduced said spring will operate the ring gear to increase the stroke of the piston.

The pressure chamber 25 may receive fluid under pressure directly from the reservoir 8 through a pipe 28 and the spring 26 may be so designed that the piston 24 will actuate the ring gear to vary the stroke of the piston 4 in accordance with the degree of pressure in reservoir 8.

If desired, any conventional type of governor means (not shown) may be employed which is responsive to the pressure in reservoir 8 and which will operate upon a build up in reservoir pressure to a predetermined degree to provide a prompt supply of fluid under pressure to chamber 25 to thereby effect prompt movement of piston 24 and thereby of the ring gear 18 to a position for reducing the stroke of the compressor piston to any desired degree or for stopping reciprocation of the piston completely. Whenever the reservoir pressure is then reduced to a desired low degree, the governor means will operate to provide prompt venting of fluid under pressure from chamber 25 to permit spring 26 to move the piston 24 back to its normal position for thereby operating the ring gear 18 to increase the stroke of the piston as required to provide the desired replacement of compressed air in the reservoir.

*Modification shown in Fig. 6*

In Fig. 6 of the drawing is shown another means for adjusting the ring gear 18 which is particularly adapted for use in connection with railway locomotives of the type operated either directly or indirectly by internal combustion engines such as the Diesel type and in which the air compressors are usually operated continuously through a connection with said engines.

In such service the Diesel engines are usually operated at a relatively low or idling speed at times when the requirements for compressed air on the locomotive and a train coupled thereto are greatest, as for instance while descending grades at which time a large amount of compressed air is usually needed for controlling the brakes on the train. The same condition exists when a train is being brought to a stop, as well as when a train is being charged with compressed air before movement out of a yard or the like. It will therefore be apparent that in this type of service an air compressor should be arranged to provide maximum output when the Diesel engines are operating at idling speed, and their output may be reduced when the Diesel engines are operating under power and at higher speeds for propelling the train at which time the requirements for compressed air on the train are at a minimum.

The variable output characteristic of my improved compressor is particularly useful in connection with this type of service and accordingly in Fig. 6 I have shown means adapted to be controlled by a Diesel engine or the like for positioning the gear ring 18 so as to vary the output of the compressor inversely to the speed of the Diesel engine.

As shown in Fig. 6 the ring gear 18 is provided with an operating arm 29 which at its outer end is connected by a pin 31 to one end of a rod 32 which is slidably mounted in a bore provided in an upwardly extending sleeve-like portion 33 of the crank case. Two collars 34 are provided on the other end of rod 32 and rotatably mounted on said rod between said collars in a ring 35 having a pair of oppositely disposed outstanding ears 36. Secured to each of these ears is one end of a lever 37 having at its opposite end a governor mass or weight 38. A pulley 39 is journaled and suitably retained in the position shown on the sleeve-like portion 33 of the crank case and is provided with a pair of oppositely arranged arms 40 each of which is connected by a rod 41 to one of the levers 37 intermediate the ends thereof. A governor control spring 42 is interposed between the end of the sleeve-like portion 33 of the crank case and the adjacent collar 34 on rod 32. The pulley 39 is connected by a belt 43 to any part of the mechanism on the locomotive which is adapted to operate continuously with and at a speed proportional to that of the propulsion engine.

In operation, whenever the Diesel engine is idling the action of centrifugal force upon the governor weights 38 due to rotation thereof is so reduced with respect to the pressure of spring 42 that said spring is enabled to move the rod 32 to its uppermost position shown and thus operate the arm 29 to turn the ring gear 18 to the position shown in Fig. 1 to thereby obtain the maximum stroke of the compressor piston 4 and thus maximum output of the compressor at the time when the greatest amount of air is usually required in this type of service.

Whenever the Diesel engine is accelerated as during the hauling of a train the action of centrifugal force on the governor weights 38 is increased and overcomes the opposing force of spring 42 and through the medium of ring 35 and the lower collar 34 is adapted to shift the rod 42 in a downwardly direction. This movement of the rod 42 operates the arm 29 to turn the ring gear 18 in a direction for reducing the stroke of the compressor piston 4. Thus while the Diesel engine on the locomotive is being employed for propelling the vehicle, under which condition the need for compressed air on the locomotive and train is reduced, the output of the compressor is also reduced.

The parts of the speed governor may be so designed as to cause a reduction in the stroke of the compressor piston and thus a reduction in the compressor output in proportion to the increase in speed of the Diesel engine above the idling speed or they may be arranged to cause the compressor output to be reduced to a desired low degree at any desired specific speed above the idling speed as will be apparent.

Summary

It will now be seen that I have provided a simple and efficient arrangement for varying the stroke of a compressor piston and thereby the output of the compressor, whereby without any modification or addition of parts a compressor may be arranged to provide air at any pressure desired for use under various conditions.

The compressor may be continuously operated without the pressure of air delivered thereby exceeding a desired value and in such use, reciprocation of the piston can be stopped if desired in order to minimize wear of the various parts of the machine. It will also be noted that when the compressor is operating at full stroke wear is minimized on the reciprocating parts since under this condition the improved structure eliminates all slide thrust of the piston against the cylinder wall and as a result also provides for a better balance of dynamic forces in the compressor and a material reduction in vibration of the compressor.

By means of an automatic type of control such as shown in either of Figs. 5 or 6 the compressor may be caused to operate at maximum stroke with maximum smoothness and a minimum of wear whenever compressing air into a reservoir or the like and when the pressure in said reservoir is adequate the compressor may be conditioned so that there will be substantially no reciprocation of the piston.

This structure is particularly adapted for control by the pressure of air delivered by the compressor or in accordance with variations in speed as above described without the use of additional apparatus such as unloaders or the like which are usually employed in connection with compressors for accomplishing the equivalent results.

While only one illustrated embodiment of the invention and various modifications thereof have been shown and described, it is not the intention to limit the scope thereto or otherwise than by the terms of the appended claims.

Having now described my invention, what I claim as new and desire to secure by Letters Patent is:

1. A fluid compressor comprising a crank shaft having a crank pin, a pinion gear journaled on said crank pin, a ring gear disposed in coaxial relation with said crank shaft and having twice the number of teeth as said pinion gear, the teeth on said gears being in mesh to effect rotation of said pinion gear upon rotation of said crank shaft, a fluid displacement piston, and means connected to said piston and having a journal connection with said pinion gear adjacent the periphery thereof for effecting reciprocation of said piston upon rotation of said pinion gear.

2. A fluid compressor comprising a crank shaft having a crank pin, a pinion gear journaled on said crank pin, a ring gear disposed in coaxial relation with said crank shaft and having twice the number of teeth as said pinion gear, the teeth on said gears being in mesh to effect rotation of said pinion gear upon rotation of said crank shaft, a fluid displacement piston, and means connected to said piston and having a journal connection with said pinion gear adjacent the periphery thereof for effecting reciprocation of said piston upon rotation of said pinion gear, said ring gear being movable around the axis of said crank shaft for adjusting the stroke of said piston upon rotation of said crank shaft, and means for securing said ring gear in an adjusted condition.

3. A fluid compressor comprising a crank shaft having a crank pin, a pinion gear journaled on said pin, a ring gear disposed in coaxial relation with said crank shaft and having twice the number of teeth as said pinion gear and in driving engagement therewith, a fluid displacement piston, means connected to said piston and having a journal connection with said pinion gear adjacent the periphery thereof and operative upon rotation of said crank shaft and pinion gear to effect reciprocation of said piston, said gears and crank pin being so arranged with respect to each other that at all times during reciprocation of said piston said journal connection is intersected by a plane including the axes of said crank shaft and piston.

4. A fluid compressor comprising a crank shaft having a crank pin, a pinion gear journaled on said pin, a ring gear arranged in coaxial relation to the axis of said crank shaft and having twice the number of teeth as said pinion gear, the teeth of said gears being in mesh to effect rotation of said pinion gear upon rotation of said crank shaft, a fluid displacement piston, means connected to said piston and having a journal connection with said pinion gear adjacent the periphery thereof for reciprocating said piston upon rotation of said pinion gear, and means for adjusting said ring gear around the axis of said crank shaft for in a dead center position of said crank pin providing various selected distances between said journal connection and a plane bisecting the axis of said crank pin and crank shaft and measured at right angles to said plane.

5. A fluid compressor comprising a casing, a crank shaft journaled in said casing and having a crank pin, a pinion gear journaled on said crank pin, a ring gear journaled in said crank case in coaxial relation with the axis of said crank shaft and having twice the number of teeth as said pinion gear, the teeth of said gears being in mesh to effect rotation of said pinion gear upon rotation of said crank shaft, a fluid displacement piston mounted to reciprocate in said casing, a connecting rod connected to said piston and having a journal connection with said pinion gear adjacent the periphery thereof for reciprocating said piston upon rotation of said pinion gear, and means operative to rotate said ring gear in its journal relative to said crank shaft for varying the stroke of said piston upon rotation of said crank shaft.

6. A fluid compressor comprising a casing, a crank shaft journaled in said casing and having a crank pin, a pinion gear journaled on said crank pin, a ring gear journaled in said crank case in coaxial relation with the axis of said crank shaft and having twice the number of teeth as said pinion gear, the teeth of said gears being in mesh to effect rotation of said pinion gear upon rotation of said crank shaft, a fluid displacement piston mounted to reciprocate in said casing, a connecting rod connected to said piston and having a journal connection with said pinion gear adjacent the periphery thereof for reciprocating said piston upon rotation of said pinion gear, said ring gear having one position in said casing to condition said pinion gear so that in a dead center position of said crank pin the axes of said crank shaft, crank pin and journal connection will be included in the same plane to provide a maximum stroke of said piston upon rotation of said crank shaft, said ring gear being rotatable in its bearing relative to said crank shaft for changing the relation of said pinion gear with respect to said crank pin to provide different reduced strokes of said piston upon rotation of said crank shaft, and means for effecting adjustment of said ring gear and for securing same in an adjusted condition.

7. A fluid compressor comprising a casing, a crank shaft journaled in said casing and having a crank pin, a pinion gear journaled on said crank pin, a ring gear journaled in said casing in coaxial relation to the axis of said crank shaft and having driving engagement with said pinion gear for effecting rotation thereof upon rotation of said crank shaft, said ring gear having twice the number of teeth as said pinion gear, a fluid displacement piston in said casing, a connecting rod connected to said piston and having a journal connection with said pinion gear adjacent the periphery thereof for effecting reciprocation thereof upon rotation of said pinion gear, and means for turning said ring gear in its journal relative to said crank shaft for varying the stroke of said piston upon rotation of said crank shaft, said means comprising a rod connected to said ring gear and operative manually to effect adjustment of said ring gear, and means for locking said rod and thereby said ring gear in an adjusted condition.

8. A fluid compressor comprising a casing, a crank shaft journaled in said casing and having a crank pin, a pinion gear journaled on said crank pin, a ring gear journaled in said casing in coaxial relation to the axis of said crank shaft and having driving engagement with said pinion gear for effecting rotation thereof upon rotation of said crank shaft, said ring gear having twice the number of teeth as said pinion gear, a fluid displacement piston in said casing, a connecting rod connected to said pinion and having a journal connection with said pinion gear adjacent the periphery thereof for effecting reciprocation thereof upon rotation of said pinion gear, and means for turning said ring gear in its journal relative to said crank shaft for varying the stroke of said piston upon rotation of said crank shaft, said means comprising a piston connected to said ring gear and adapted to be operated by fluid under pressure on one face for actuating said ring gear to reduce the stroke of said piston, and a spring operative upon relief of said fluid pressure on said piston to effect operation of said ring gear to increase the stroke of said piston.

9. A fluid compressor comprising a casing, a crank shaft journaled in said casing and having a crank pin, a pinion gear journaled on said crank pin, a ring gear journaled in said casing in coaxial relation to the axis of said crank shaft and having driving engagement with said pinion gear for effecting rotation thereof upon rotation of said crank shaft, said ring gear having twice the number of teeth as said pinion gear, a fluid displacement piston in said casing, a connecting rod connected to said piston and having a journal connection with said pinion gear adjacent the periphery thereof for effecting reciprocation thereof upon rotation of said pinion gear, and means for turning said ring gear in its journal relative to said crank shaft for varying the stroke of said piston upon rotation of said crank shaft, said means comprising a speed governor, driving means for operating said speed governor at various speeds, said speed governor including a member adjustable in accordance with the speed of operation of said driving means, and means connecting said member to said ring gear for actuating same to increase the stroke of said piston as the speed of said driving means is reduced and to reduce the stroke of said piston upon an increase in speed of said driving means.

10. A fluid compressor comprising a crank shaft, a pinion gear having at its axis a journal connection with said crank shaft at a point spaced from the axis of said crank shaft, a ring gear arranged in coaxial relation with said crank shaft and encircling and having driving engagement with said pinion gear for turning said pinion gear upon rotation of said crank shaft, said ring gear having twice as many teeth as said pinion gear, and movable fluid displacement means connected to said pinion gear at a point spaced from the axis of said pinion gear and operable by said pinion gear upon rotation thereof.

11. A fluid compressor comprising a crank shaft, a pinion gear having at its axis a journal connection with said crank shaft at a point spaced from the axis of said crank shaft, a ring gear arranged in coaxial relation with said crank shaft and encircling and having driving engagement with said pinion gear for turning said pinion gear upon rotation of said crank shaft, means for turning said ring gear about its axis to different positions and for holding same in such positions, said ring gear having twice as many teeth as said pinion gear, and movable fluid displacement means connected to said pinion gear at a point spaced from the axis of said pinion gear and operable by said pinion gear upon rotation thereof.

GEORGE K. NEWELL.

CERTIFICATE OF CORRECTION.

Patent No. 2,277,135.  March 24, 1942.

GEORGE K. NEWELL.

It is hereby certified that error appears in the printed specification of the above numbered patent requiring correction as follows: Page 5, first column, line 41, claim 8, for "pinion" read --piston--; and that the said Letters Patent should be read with this correction therein that the same may conform to the record of the case in the Patent Office.

Signed and sealed this 3rd day of November, A. D. 1942.

Henry Van Arsdale,
Acting Commissioner of Patents.

(Seal)